(12) United States Patent
Frank

(10) Patent No.: US 7,592,601 B2
(45) Date of Patent: Sep. 22, 2009

(54) RADIATION DETECTION SYSTEM USING SOLID-STATE DETECTOR DEVICES

(75) Inventor: David L. Frank, Boca Raton, FL (US)

(73) Assignee: Innovative American Technology Inc., Coconut Creek, FL (US)

( * ) Notice: Subject to any disclaimer, the term of this patent is extended or adjusted under 35 U.S.C. 154(b) by 230 days.

(21) Appl. No.: 11/291,574

(22) Filed: Dec. 1, 2005

(65) Prior Publication Data

US 2006/0157654 A1    Jul. 20, 2006

Related U.S. Application Data

(63) Continuation-in-part of application No. 10/280,255, filed on Oct. 25, 2002, now Pat. No. 7,005,982.

(60) Provisional application No. 60/347,997, filed on Oct. 26, 2001, provisional application No. 60/631,865, filed on Dec. 1, 2004.

(51) Int. Cl.
*G01T 3/06* (2006.01)
(52) U.S. Cl. .................................. 250/390.01
(58) Field of Classification Search ............ 250/390.01, 250/370.05
See application file for complete search history.

(56) References Cited

U.S. PATENT DOCUMENTS 6,479,826 B1   11/2002   Klann et al.
6,545,281 B1   4/2003   McGregor et al.
7,230,250 B2 * 6/2007   Kaplan et al. .......... 250/390.01
2005/0258372 A1 * 11/2005 McGregor et al. ..... 250/390.01

* cited by examiner

*Primary Examiner*—David P Porta
*Assistant Examiner*—Djura Malevic
(74) *Attorney, Agent, or Firm*—Jose Gutman; Fleit Gibbons Gutman Bongini & Bianco, P.L.

(57) ABSTRACT

A neutron detection device (100) includes a semiconductor substrate including a gallium arsenide substrate region (102) having a back surface, and a high purity gallium arsenide active region (104) having a front surface. A back contact layer (118) is disposed on the back surface for providing a first voltage potential at the back surface. A plurality of elongated tube cavities extend from a plurality of respective openings in the front surface into the high purity gallium arsenide active region (104) and almost through, but not totally through, the high purity gallium arsenide active region (104). A front contact layer is disposed on the front surface for providing a second voltage potential at the front surface. Neutron reactive material, e.g., pulverized Boron-10 powder, fills the plurality of elongated tube cavities to a high packing density. A radiation detection system and a method of fabricating the neutron detection device are also disclosed.

5 Claims, 8 Drawing Sheets

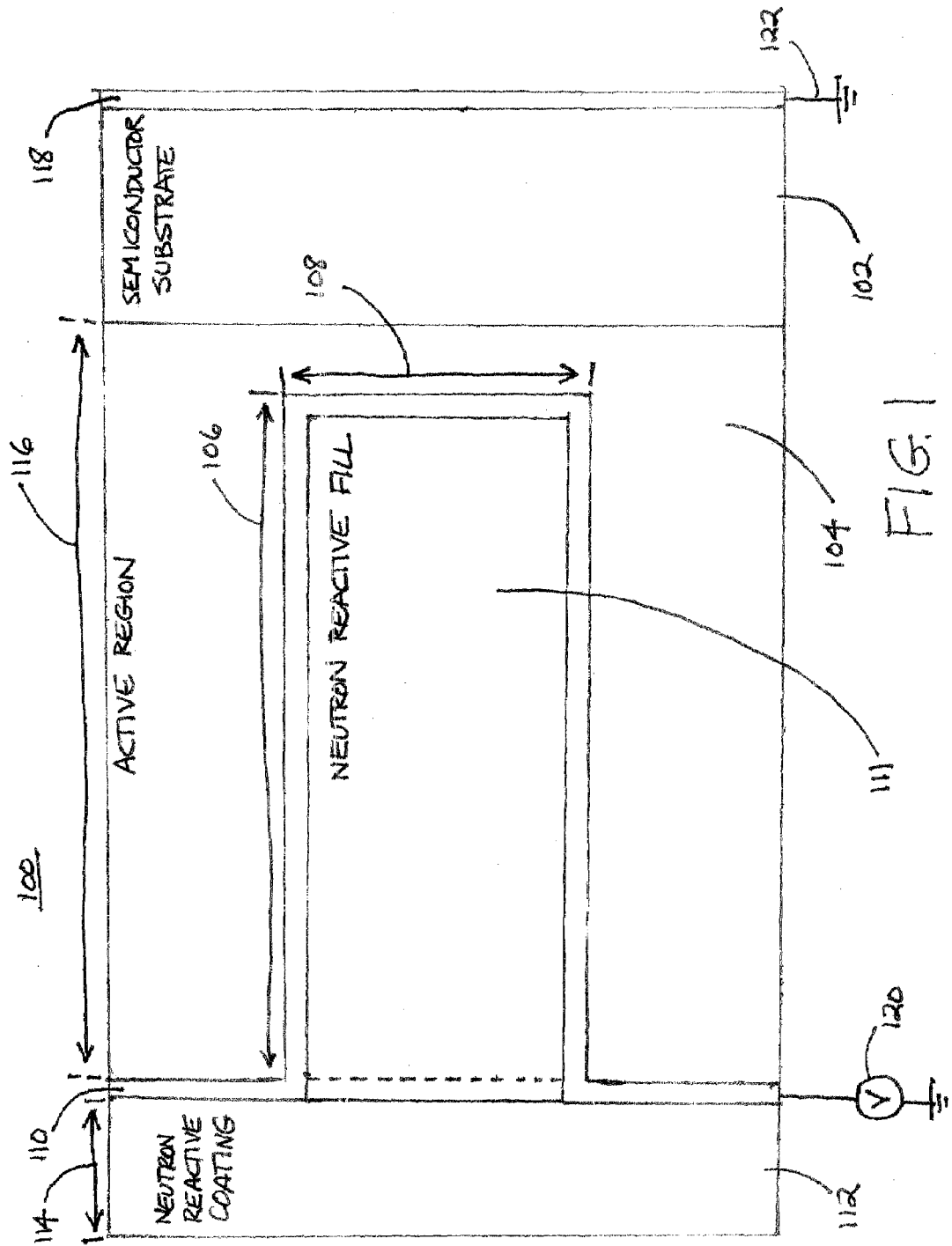

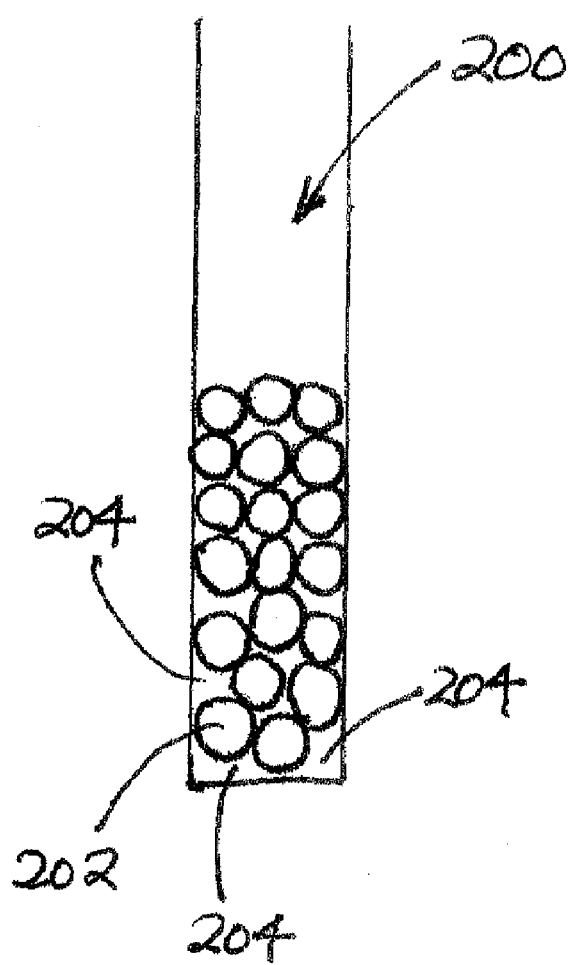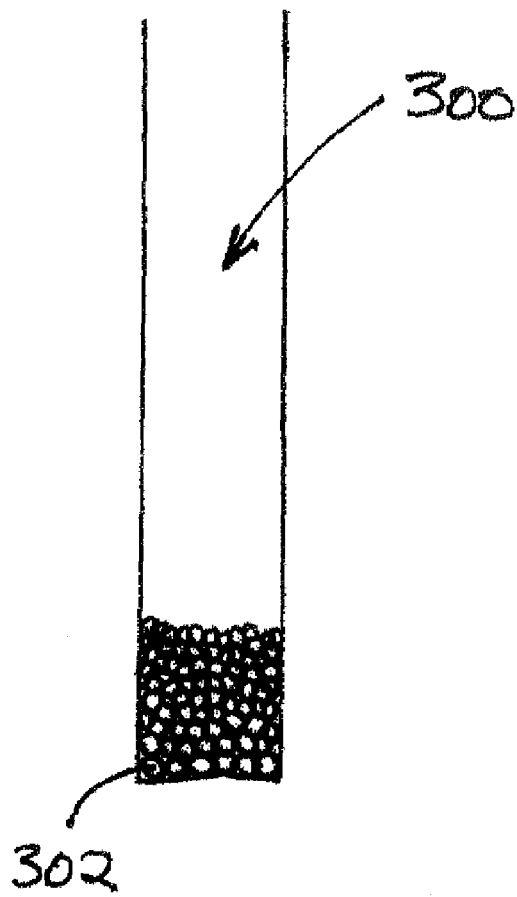

RADIATION DETECTION SYSTEM USING SOLID-STATE DETECTOR DEVICES

CROSS-REFERENCE TO RELATED APPLICATIONS

This application is a continuation-in-part of, and claims priority from, prior U.S. patent application Ser. No. 10/280,255, filed on Oct. 25, 2002, now U.S. Pat. No. 7,005,982 which was based on prior U.S. Provisional Patent Application No. 60/347,997, filed on Oct. 26, 2001, now expired, and further claims priority from prior U.S. Provisional Patent Application No. 60/631,865, filed on Dec, 1, 2004, collectively the entire disclosure of which is herein incorporated by reference.

BACKGROUND OF THE INVENTION

1. Field of the Invention

This invention relates in general to radiation sensing and detection systems, and more particularly to a neutron detection system that uses solid-state or semiconductor neutron detectors.

2. Description of Related Art

Current attempts at providing radiation and neutron detection systems have resulted in detection systems that have limited sensitivity and efficiency at detecting, in particular, neutron radiation. Further, these conventional implementations can be very expensive to manufacture and fragile during use. These characteristics of current neutron detectors detrimentally affect the commercial viability of radiation detection systems and particularly reduce their effectiveness in rugged-use environments.

Therefore a need exists to overcome the problems with the prior art as discussed above.

SUMMARY OF THE INVENTION

The present invention, inter alia, provides a system and method of detecting neutron radiation with higher efficiency and sensitivity than other systems in the past.

Also, an embodiment of the present invention benefits from mass manufacturing techniques typically used in semiconductor manufacturing processes thereby yielding more cost effective neutron detection devices and systems. This enhances the commercial viability of a radiation and neutron detection system. Neutron detectors, according to the present invention, are built more rugged for more reliable use in many difficult operating conditions and rugged environments, while allowing remote monitoring by remotely located information processing systems and supervisory personnel.

According to an embodiment, a method of fabricating a neutron detection device, comprises pulverizing neutron reactive material to provide granules that have a high packing density when filling elongated tube cavities in an active region of a neutron detection semiconductor device; bringing to a common electric potential the pulverized neutron reactive material and a semiconductor wafer having a neutron detection semiconductor device being fabricated on the semiconductor wafer; and while maintaining the pulverized neutron reactive material and the semiconductor wafer at the common electric potential, filling the elongated tube cavities to a high packing density with the pulverized neutron reactive material.

According to another embodiment, a neutron detection device comprises a semiconductor substrate including a substrate region having a back surface and an active region having a front surface. The neutron detection device further comprises a back contact layer disposed on the back surface for providing a first voltage potential at the back surface; a plurality of elongated tube cavities extending from a plurality of respective openings in the front surface and continuing into the active region and almost through, but not totally through, the active region; a front contact layer disposed on the front surface for providing a second voltage potential at the front surface; and neutron reactive material filling the plurality of elongated tube cavities.

The neutron detection device, optionally, can comprise gallium arsenide or germanium, and the active region of the neutron detection semiconductor device respectively comprises a high purity gallium arsenide active region or a high purity germanium active region.

In one embodiment of the present invention, the neutron reactive material filling the plurality of elongated tube cavities comprises Boron-10 powder having granules of a mean diameter less than or equal to approximately 1 micron, the Boron-10 powder filling the plurality of elongated tube cavities at a high packing density.

The active region, according to an embodiment, comprises a layer of significantly increased thickness to significantly increase the length of the plurality of elongated tube cavities extending from the plurality of respective openings in the front surface and continuing into the active region and almost through, but not totally through, the active region.

Optionally, a neutron reactive coating layer, including a mixture of neutron reactive material such as Boron-10 and a polymer base vehicle, is disposed on the front contact layer and covering the openings of the plurality of filled elongated tube cavities thereby securely packing the neutron reactive material filling the plurality of elongated tube cavities.

According to an embodiment of the present invention, a neutron radiation sensor system comprises and array of neutron detection devices, each such neutron detection device comprising: a semiconductor substrate including a substrate region having a back surface and an active region having a front surface; a back contact layer disposed on the back surface for providing a first voltage potential at the back surface; a plurality of elongated tube cavities extending from a plurality of respective openings in the front surface and continuing into the active region and almost through, but not totally through, the active region; a front contact layer disposed on the front surface for providing a second voltage potential at the front surface; and neutron reactive material filling the plurality of elongated tube cavities.

Optionally, the neutron radiation sensor system further includes a data collection system, electrically coupled with each neutron detection device of the array of neutron detection devices, to collect signals from the array of neutron detection devices, the collected signals representing whether each neutron detection device has detected neutron radiation; and a remote monitoring system, communicatively coupled with the data collection system, to remotely monitor the collected signals from the array of neutron detection devices and thereby remotely determine whether one or more neutron detection devices from the array have detected neutron radiation.

BRIEF DESCRIPTION OF THE DRAWINGS

FIG. 1 is a simplified schematic side view of a neutron detector device in accordance with an embodiment of the present invention.

FIGS. 2 and 3 are two side views showing tube cavities filled with neutron reactive material of different packing densities.

DETAILED DESCRIPTION

Figure 4:
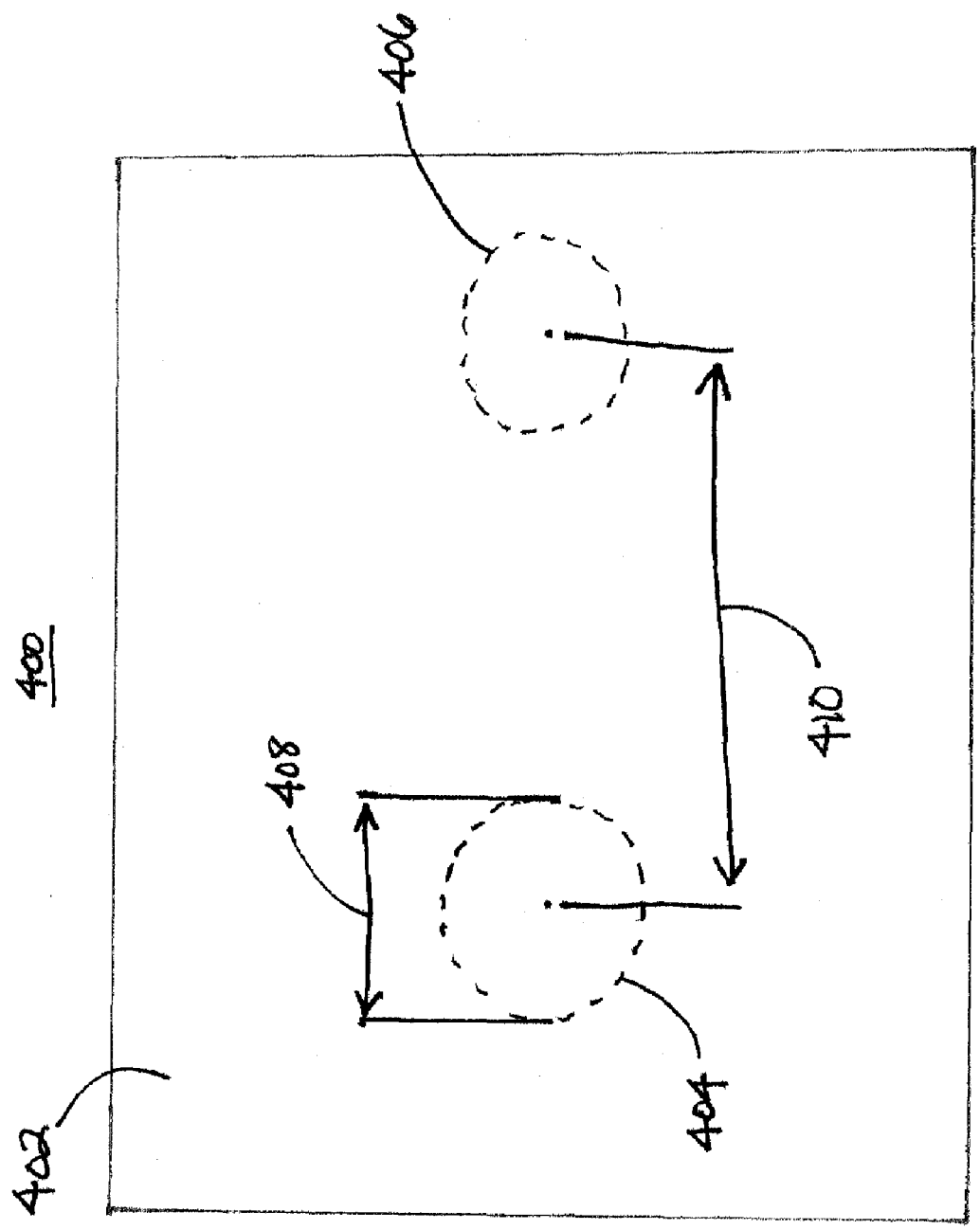
FIG. 4 is a front view of a neutron detector device showing exemplary dimensions for tube cavities in the neutron detector device, according to an embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "program", "computer program", "software application", and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to an embodiment, overcomes problems with the prior art by providing a neutron detection device with significantly improved detection efficiency and sensitivity. The neutron detection device comprises a semiconductor substrate including a substrate region and an active region having a front surface. A plurality of elongated tube cavities extend from a plurality of respective openings in the front surface and continue into the active region and almost through, but not totally through, the active region. Neutron reactive material, such as Boron-10 powder having granules with mean diameter of less than or equal to approximately 1 micron, fills the plurality of elongated tube cavities at a high packing density.

According to an embodiment of the present invention, a neutron radiation sensor system comprises and array of such neutron detection devices. A data collection system is electrically coupled with each neutron detection device of the array to collect signals from the array of neutron detection devices, the collected signals representing whether each neutron detection device has detected neutron radiation. Optionally, a remote monitoring system is communicatively coupled with the data collection system to remotely monitor the collected signals from the array of neutron detection devices and thereby remotely determine whether one or more neutron detection devices from the array have detected neutron radiation.

Described now is an exemplary neutron detection device and an exemplary neutron radiation sensor system according to exemplary embodiments of the present invention.

An exemplary neutron detection device 100, such as illustrated in FIG. 1, provides significantly improved detection efficiency and sensitivity over radiation detection devices of the past. The inventive features and advantages of the present neutron detection device 100 will be discussed below. However, it is assumed that the reader has an understanding of neutron detection semiconductor technology. Examples of neutron detection semiconductor devices and technology are described in U.S. Pat. No. 6,545,281 to McGregor et al., filed on Jul. 6, 2001, and entitled "POCKED SURFACE NEUTRON DETECTOR", and additionally described in U.S. Pat. No. 6,479,826 to Klann et al., filed on Nov. 22, 2000, and entitled "COATED SEMICONDUCTOR FOR NEUTRON DETECTION", the entire collective teachings of these two U.S. patents being hereby incorporated by reference.

Referring to FIG. 1, a neutron detection device 100 includes a semiconductor substrate that has a semiconductor substrate region 102 and an active region 104. The active region 104 may also be referred to herein, without limitation and with an intent to continue to use the broadest meaning of the term, as a high purity active region or as a not intentionally doped (NID) layer. The active region 104, during normal operation of the neutron detection device 100, exhibits an internal electric field that causes free charges to separate and drift across the active region 104. The motion of the free charges induces a signal to appear on an amplifier circuit (not shown) that is electrically coupled to the active region 104, typically via the front contact layer 110. The back contact layer 118 is electrically coupled to ground 122 while the front contact layer 110 is electrically coupled to a voltage potential 120 thereby providing power to the neutron detection device 100.

A device 100 comprising gallium arsenide will include a gallium arsenide substrate region 102 and a high purity gallium arsenide active region 104. A device 100 comprising germanium will include a germanium substrate region 102 and a high purity germanium active region 104. It is appreciated by those of ordinary skill in the art in view of the present discussion that the neutron detection device 100 can be made of many different types of semiconductor materials that generally will include a semiconductor substrate with a substrate region 102 and an active region 104, and that will detect neutron radiation, as will be discussed in more detail below.

When an alpha particle, or other neutron radiation product, (which are collectively and interchangeably referred to herein as an alpha particle), is released from the reaction of an energetic neutron interacting with neutron reactive material in the device 100, such as material in the neutron reactive fill 111 and in the neutron reactive coating 112, the released alpha particle may be emitted from the neutron reactive material and then enter the active region 104 of the semiconductor substrate. The energy transferred to the neutron detection semiconductor device 100, into the active region 104 of the semiconductor substrate, will produce voltage signals in an amplifier circuit (not shown) that is electrically coupled to the active region 104. In this way, neutron radiation is detected by the neutron detection device 100.

The efficiency of detection and the sensitivity of the detection for the neutron detection device 100 are significantly enhanced by the present invention, as will be discussed below. Further, an embodiment of the present invention will typically be more rugged in construction thereby allowing use in difficult environments and rugged-use applications. Additionally, by using a mass manufacturing semiconductor process to fabricate these devices 100, the cost per device 100 will be significantly reduced thereby enhancing the commercial viability of the neutron detection device 100 and of a system implemented using the neutron detection device 100.

The neutron detection device 100 includes an active region 104 that, according to one embodiment, will be of significantly increased thickness than found in conventional device active regions. The thickness 116 of this active region 104, according to the one embodiment, is 10 microns.

A plurality of elongated tube cavities are formed in the semiconductor substrate of the device 100 using known semiconductor manufacturing processes. According to the present invention, each elongated tube cavity extends from the front surface of the active region 104 and continues into the active region 104 and almost through, but not totally through, the active region 104. This feature of an embodiment of the present invention can significantly improve the signal-to-noise ration (i.e., the sensitivity) of the detector 100. The depth 106 of the elongated tube cavity can vary for various applications, depending on the thickness 116 of the active region 104. The diameter 108 of the elongated tube cavity can also vary depending on the application. To enhance the efficiency of detection by the device 100, the diameter 108 can be between two and five microns.

A front contact layer 110 is disposed on the front surface of the active region 104. The front contact layer 110 during use is electrically coupled to a voltage source 120 to provide a voltage potential at the front surface of the active region 104.

The plurality of elongated tube cavities are filled with neutron reactive material, also referred to herein as neutron reactive fill 111. The neutron reactive fill 111, according to an embodiment, comprises Boron-10. In one embodiment, the fill 111 comprises Boron-10 powder. The powder includes Boron-10 granules that, according to one embodiment of the present invention, are very fine to significant enhance the packing density of the Boron-10 powder 111 in the elongated tube cavities. The mean diameter of the granules is, according to one embodiment, less than or equal to approximately 1 micron. Such a mean diameter for the Boron-10 powder granules will result in a high packing density when filing the tube cavities. The higher the packing density of the Boron-10 powder filling the cavities, the higher the probability of capture/interaction with energetic neutrons traveling into the cavities.

FIGS. 2 and 3 illustrate this high packing density feature according the present invention. The cavity 200 shown in FIG. 2 is filled with Boron-10 powder granules 202 having a first mean diameter. Notice the voids 204 remaining between the granules 202 when packed into the cavity 200. On the other hand, the cavity 300 shown in FIG. 3 is filled with Boron-10 powder granules 302 having a second mean diameter that is significantly smaller than the first mean diameter of the granules 202 packed into the cavity 200 shown in FIG. 2. There are very few and much smaller voids remaining between the granules 302, shown in FIG. 3, when packed into the cavity 300. This results in a high packing density. It has been determined that a high packing density for the neutron reactive fill 111 in the elongated tube cavities is obtained with Boron-10 powder granules having a mean diameter of less than or equal to approximately 1 micron. Generally, neutron reactive materials with granules having a mean diameter of less than or equal to approximately 1 micron will have similar high packing density in the elongated tube cavities.

After the neutron reactive fill 111 is packed into the elongated tube cavities, then a coating 112 of neutron reactive material is applied to the front surface of the front contact layer 110. This neutron reactive coating 112 covers the front contact layer 110 and the openings of the elongated tube cavities that are packed with neutron reactive fill 111. The neutron reactive coating 112, according to one exemplary embodiment, comprises Boron-10 mixed with a polymer base vehicle. An organic polymer base vehicle, in one embodiment, can be mechanically mixed with Boron-10 powder to create a "paint-like" coating that can be applied to the front of the device 100. Of course, semiconductor mass manufacturing processes normally would use wafers to create large numbers of devices 100 during one manufacturing process. The "paint-like" coating would be applied to the front surface of the entire wafer. According to one embodiment, the coating 112 on the device 100 has a thickness 114 of approximately 3 or more microns. After the coating is applied, it cures, hardens, and bonds to the front contact layer 110 and to the neutron reactive fill 111 at the openings of the elongated tube cavities thereby securely packing the neutron reactive fill 111 in the elongated tube cavities. The neutron reactive coating 112 securely holds the neutron reactive fill 111 in the elongated tube cavities while enhancing the efficiency of the detection of the device 100. Energetic neutrons can interact with the neutron reactive coating 112 and with the neutron reactive fill 111 in the elongated tube cavities thereby transferring energy to the active region 104 of the semiconductor substrate. The energy transferred to the active region 104 will typically affect a signal received by an amplifier circuit (not shown) that is electrically coupled to the active region 104. This change in signal will then correspond to a detection of the energetic neutrons.

Referring to FIG. 4, a front view of an exemplary neutron detection device 400 is shown. Exemplary dimensions of two elongated tube cavities 404, 406 are indicated by the arrows 408, 410. Note that the cavities 404, 406, are shown with dashed lines because these would normally be covered by a neutron reactive coating 402 (also see the neutron reactive coating 112 shown in FIG. 1). As an example, and not for limitation, the cavities 404, 406, can be between two and five microns in diameter 408. The center-to-center spacing 410 between cavities 406, 408, according to the example, can be between five and twenty microns.

Figure 5:
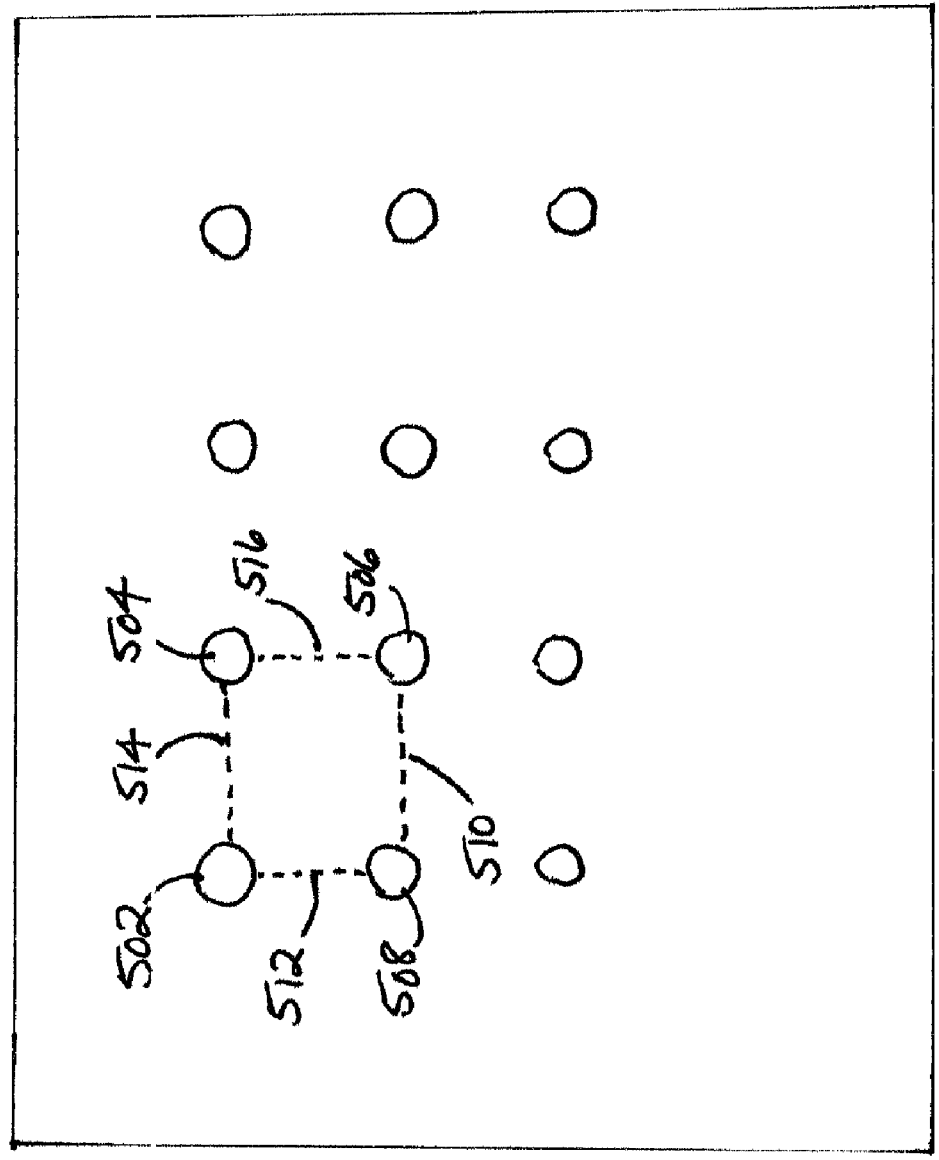
FIGS. 5 and 6 are two front views of neutron detector devices showing alternative arrangements for tube cavities in the respective neutron detector devices.
Figure 6:
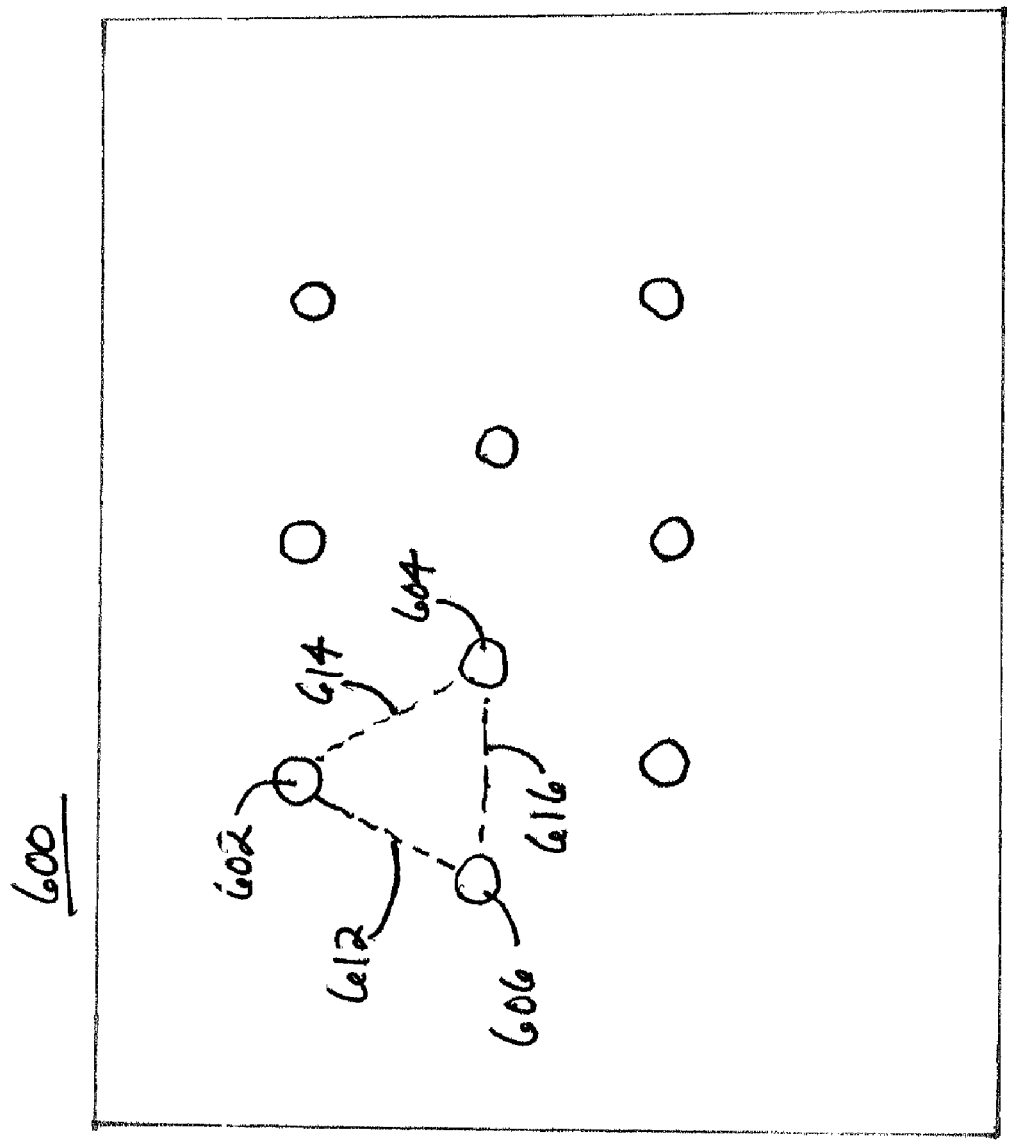

FIGS. 5 and 6 illustrate two front views of neutron detection devices 500, 600, respectively, having two alternative arrangements for a pattern of elongated tube cavities in the devices 500, 600. FIG. 5 shows a square pattern arrangement where the cavities 502, 504, 506, 508, are arranged in a square pattern with substantially equal length sides 510, 512, 514, 516, 518, defining the square pattern. FIG. 6, alternatively, shows a triangular pattern arrangement where the cavities 602, 604, 606, are arranged in a triangular pattern. Note in one embodiment, the triangular pattern arrangement has substantially equal length sides 612, 614, 616, defining the substantially equilateral triangular pattern.

Figure 7:
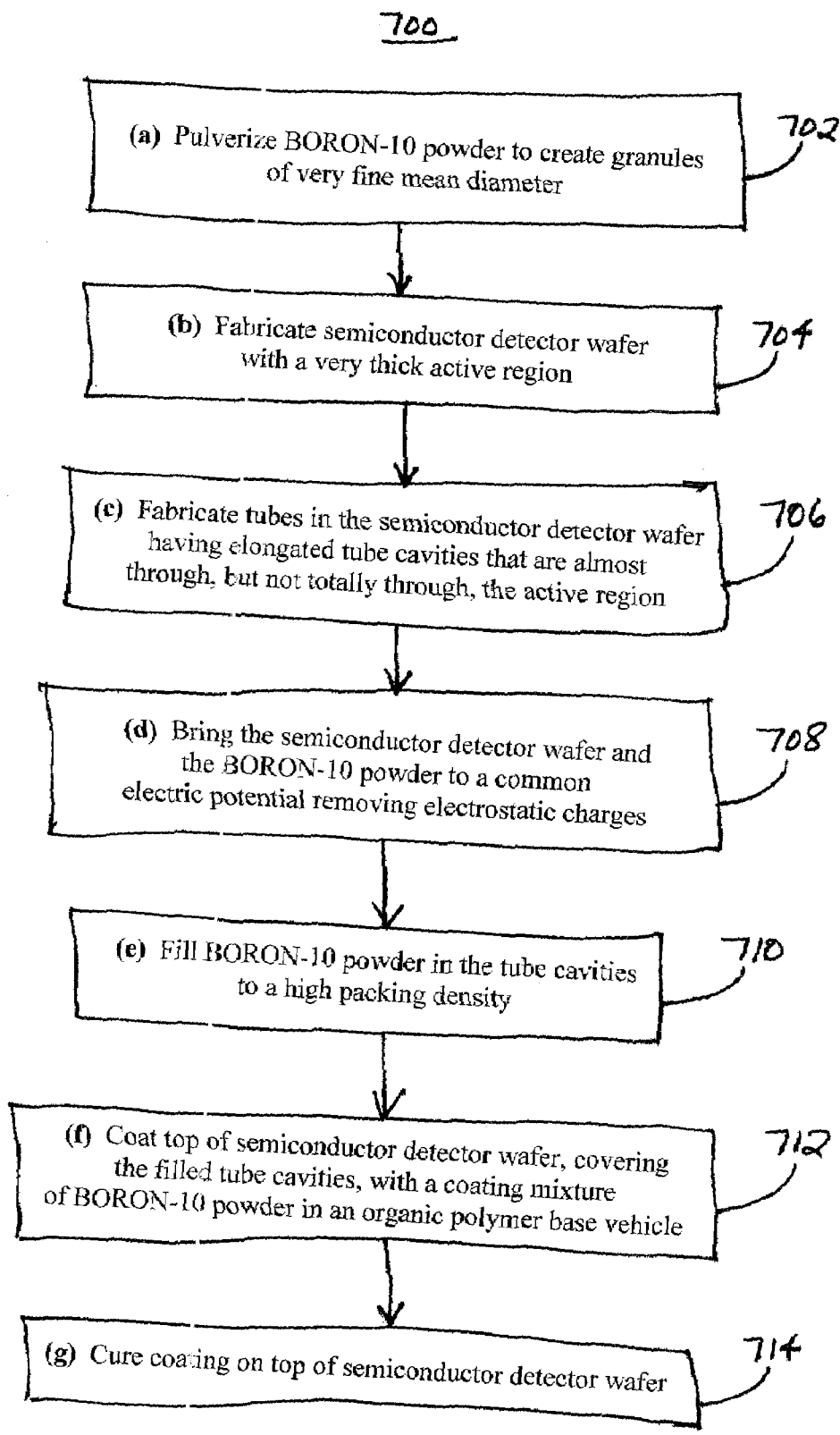
FIG. 7 is a flow diagram illustrating an exemplary fabrication process for making neutron detector devices according to an embodiment of the present invention.

A method of fabricating a neutron detection device 100, with reference to FIG. 7, is discussed below.

A semiconductor manufacturing process can be applied to the fabrication of large quantities of these devices 100, as should be understood by those of ordinary skill in the art in view of the present invention. However, certain manufacturing process steps will be more fully detailed below with respect to fabricating the neutron detection devices 100.

Neutron reactive material, such as Boron-10, is pulverized 702 to provide granules that have a high packing density when filling the elongated tube cavities in an active region of a neutron detection semiconductor device 100. As has been discussed above, a fine mean diameter for the granules, such as less than or equal to 1 micron, is desired for a high packing density.

Further, during manufacture of the semiconductor wafers supporting the neutron detection devices 100, it is desirable to make 704 the active region layer 104 very thick. This will allow the length 106 of the elongated tube cavities to be maximized.

The elongated tube cavities are made 706 in the active region 104 such that the cavities extend from respective openings in a surface of the active region 104 and continue almost through, but not totally through, the active region 104 of a neutron detection semiconductor device 100 being fabricated on the semiconductor wafer.

To fill the cavities with the neutron reactive material 111, it is recommended to bring 708 to a common electric potential both the pulverized neutron reactive material for filling the cavities and the semiconductor wafer including the elongated tube cavities. By maintaining a common electric potential it avoids build up of electrostatic charges thereby avoiding repulsion and attraction between the particles of the neutron reactive material and also between the particles and the wafer during a filling operation. For example, one can ground both the pulverized Boron-10 powder and the semiconductor wafer before filling the cavities in the semiconductor wafer. By bringing both to a common electric potential it will allow the particles of the fill 111 to more easily go into the cavities and to more tightly pack therein enhancing the packing density. It is desirable to obtain a high packing density. Then, while maintaining the pulverized neutron reactive material (such as the Boron-10 powder) and the semiconductor wafer at the common electric potential (such as both grounded), the elongated tube cavities can be more easily filled 710 with the pulverized neutron reactive material 111 to a high packing density. The pulverized neutron reactive material 111 can be put into the cavities mechanically or via ultrasonic vibration.

After the cavities are filled, the process continues and a neutron reactive coating is applied to the top of the semiconductor wafer. That is, the front of each of the neutron detection devices 100 being fabricated in the wafer will be coated with the neutron reactive coating. The coating can be made of a mixture of Boron-10 powder and a polymer base vehicle to a "paint-like" consistency. Then, it is applied 712 to the wafer, and then allowed to cure 714 and harden. This coating layer hardens and bonds to the front of the device 100 and secure holds the neutron reactive fill 111 in the cavities.

As a first example, a first group of exemplary neutron detection devices 100 was made, in accordance with the present invention, using the following dimensions and specifications.

GaAs layer—p doped 0.3 micron
InGaP layer—0.05 micron
GaAs layer—NID—10 microns (some devices were made using 5 microns)
InGaP layer—n doped—0.05 microns
GaAs layer—n doped—1.0 microns
GaAs Substate 2E18

As a second example, a second group of neutron detection devices 100 was made, according to the present invention, using the following dimensions and specifications.

Figure 8:
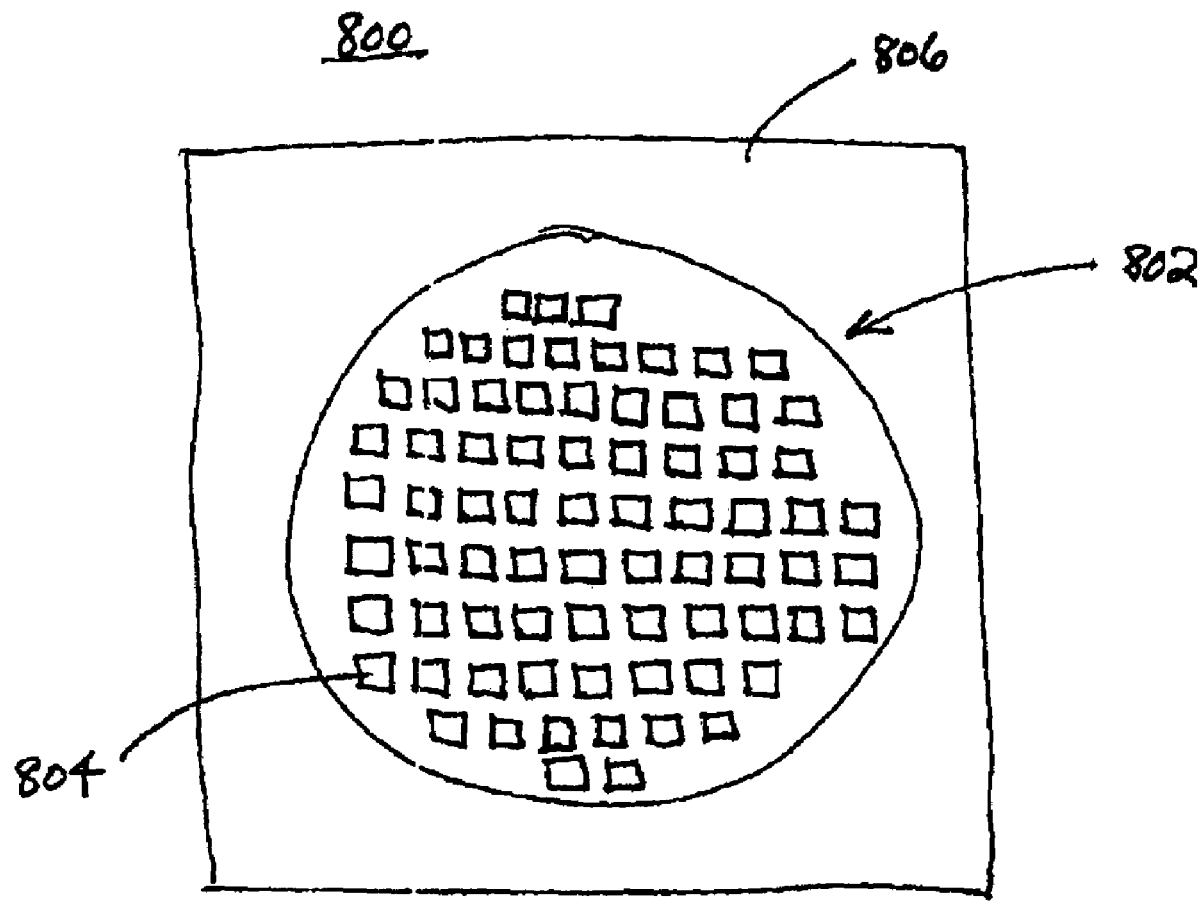
FIG. 8 is a front view of an exemplary array of neutron detector devices.

GaAs layer—p doped 0.1 micron
GaAs layer—NID—10 microns (some devices were made using 5 microns)
GaAs layer—n doped—1.0 microns
GaAs Substate FIG. 8 illustrates an array 802 of neutron detection devices 804 that can be mounted on a base 806, such as on a circuit board, to create a neutron radiation sensor unit 800. In one embodiment, this array generally includes approximately eight rows by approximately eight columns of neutron detection devices.

Figure 9:
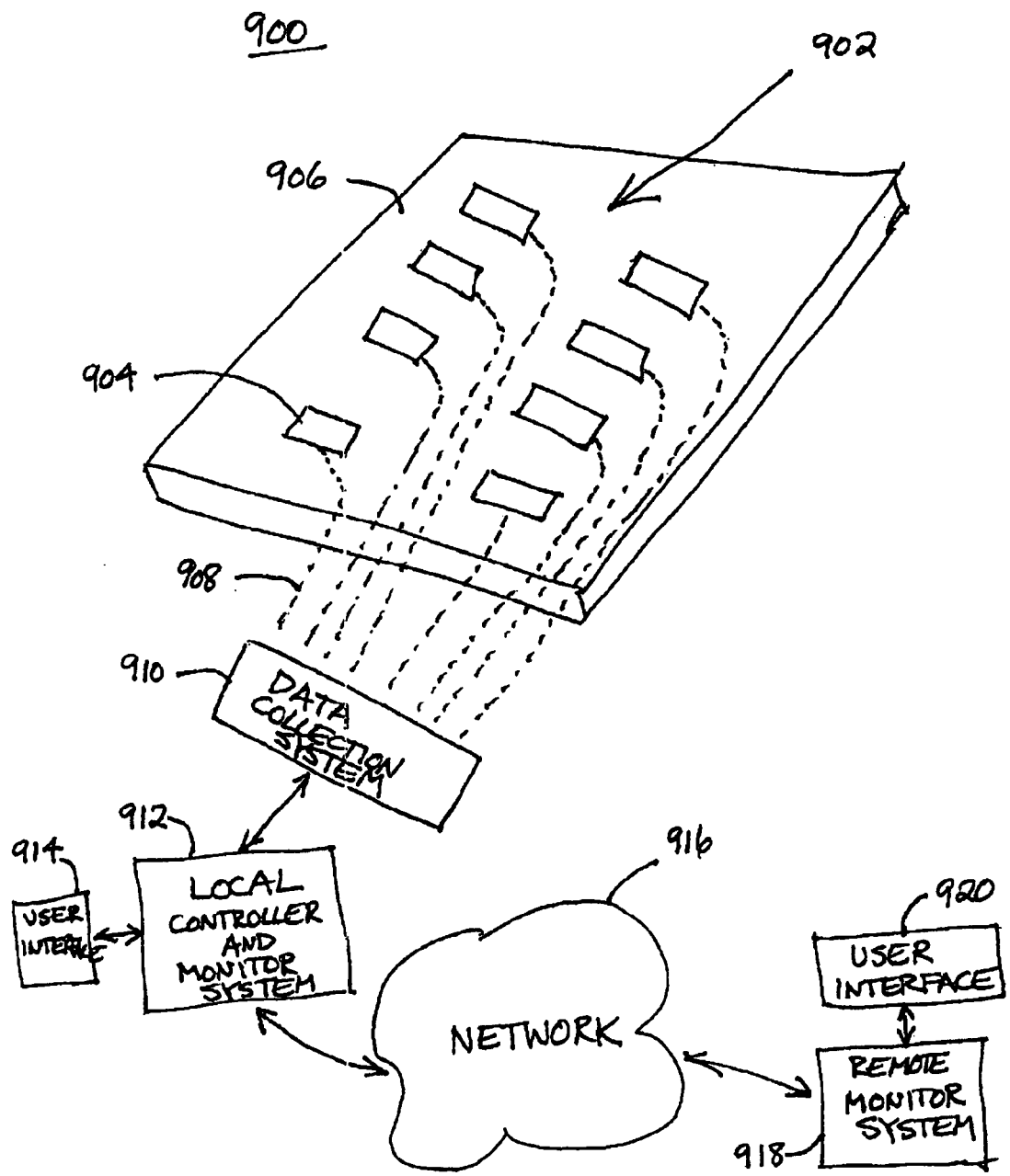
FIG. 9 is a simplified system block diagram showing an exemplary configuration for a radiation and neutron detection system according to an embodiment of the present invention.

Referring to FIG. 9, an exemplary neutron radiation sensor system 900 is shown. In this exemplary application, the system 900 is used to monitor a roadway 906. Embedded in the roadway is a collection 902 of strategically located neutron radiation sensor units 904. Each sensor unit 904 resembles the neutron radiation sensor unit 800 shown in FIG. 8.

A data collection system 910, in this example, is communicatively coupled via cabling or other communication link 908 with each of the neutron detection devices 804 of each array 802 in each sensor unit 904. The data collection system includes an information processing system with data communication interfaces that collect signals from the neutron radiation sensor units 904. The collected signals represent information indicating whether each neutron detection device 804 has detected neutron radiation.

The data collection system 910 is communicatively coupled with a local controller and monitor system 912. The local system 912 comprises an information processing system that has a computer, memory, storage, and a user interface 914 such a display on a monitor and a keyboard, or other user input/output device. The user interface 914 allows service or supervisory personnel to operate the system 912 and to monitor the status of neutron detection by the collection 902 of sensor units 904 at the roadway 906.

The data collection system 910 can also be communicatively coupled with a remote control and monitoring system 918, such as via a network 916. The remote system 918 comprises an information processing system that has a computer, memory, storage, and a user interface 920 such a display on a monitor and a keyboard, or other user input/output device. The network 916 comprises any number of local area networks and/or wide area networks. It can include wired and/or wireless communication networks. This network communication technology is well known in the art. The remote system 918 includes a user interface 920 that allows remotely located service or supervisory personnel to operate the system 918 and to monitor the status of neutron detection by the collection 902 of sensor units 904 at the roadway 906. By operating the system remotely, such as from a central monitoring location, a larger number of sites can be safely monitored by a limited number of supervisory personnel. Besides monitoring roadways, as illustrated in the example of FIG. 9, it should be clear that many different applications can benefit from the monitoring function to detect neutron radiation. For example, crane mounted sensor units 904 communicating with a remote monitoring system 918 allow neutron radiation monitoring where large amounts of cargo are moved and handled, such as at ports and stations, and at such other places that have large amounts of cargo to handle a should be understood by those of ordinary skill in the art in view of the present discussion. This monitoring capability, both local and remote monitoring, and at a significantly reduced cost of deploying and running such a monitoring system, provides a significant commercial advantage.

Additionally, the system monitoring function can be combined to monitor more than neutron radiation. Other types of hazardous and explosive elements can be monitored in combination with the neutron radiation detection by combining appropriate sensors and detectors for these other types of hazardous and explosive elements with the neutron radiation sensor units and monitoring system according to alternative embodiments of the present invention.

The preferred embodiments of the present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

A preferred embodiment according to present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of fabricating a neutron detection device, comprising:
    pulverizing neutron reactive material to provide granules that have a high packing density when filling elongated tube cavities in an active region of a neutron detection semiconductor device, wherein a center to center distance between each elongated tube is between 5 and 20 microns;
    bringing to a common electric potential
        the pulverized neutron reactive material, and
        a semiconductor wafer including elongated tube cavities extending from respective openings in a surface of an active region of a neutron detection semiconductor device being fabricated on the semiconductor wafer and continuing almost through, but not totally through, the active region, wherein the active region exhibits an internal electric field causing free charges to separate and drift across the active region; and
    while maintaining the pulverized neutron reactive material and the semiconductor wafer at the common electric potential, filling the elongated tube cavities to a high packing density with the pulverized neutron reactive material.

2. The method of claim 1, further comprising:
    coating the surface of the active region, and including coating the pulverized neutron reactive material at the openings in the surface after the elongated tube cavities are filled, with a neutron reactive coating layer comprising Boron-10 mixed with a polymer base vehicle, the coating securely packing the neutron reactive material filling the elongated tube cavities to a high packing density.

3. The method of claim 1, wherein the pulverized neutron reactive material filling the elongated tube cavities comprises Boron-10.

4. The method of claim 1, wherein the pulverized neutron reactive material filling the elongated tube cavities comprises Boron-10 powder having granules of a mean diameter less than or equal to approximately 1 micron to provide a high packing density in the elongated tube cavities.

5. The method of claim 1, wherein the neutron detection semiconductor device being fabricated on the semiconductor wafer comprises gallium arsenide or germanium; and
    wherein the active region of the neutron detection semiconductor device respectively comprises a high purity gallium arsenide active region or a high purity germanium active region.

* * * * *